Aug. 1, 1939. C. OLDER 2,167,904
CONCRETE EXPANSION AND CONTRACTION JOINT
Filed May 18, 1936 4 Sheets-Sheet 1
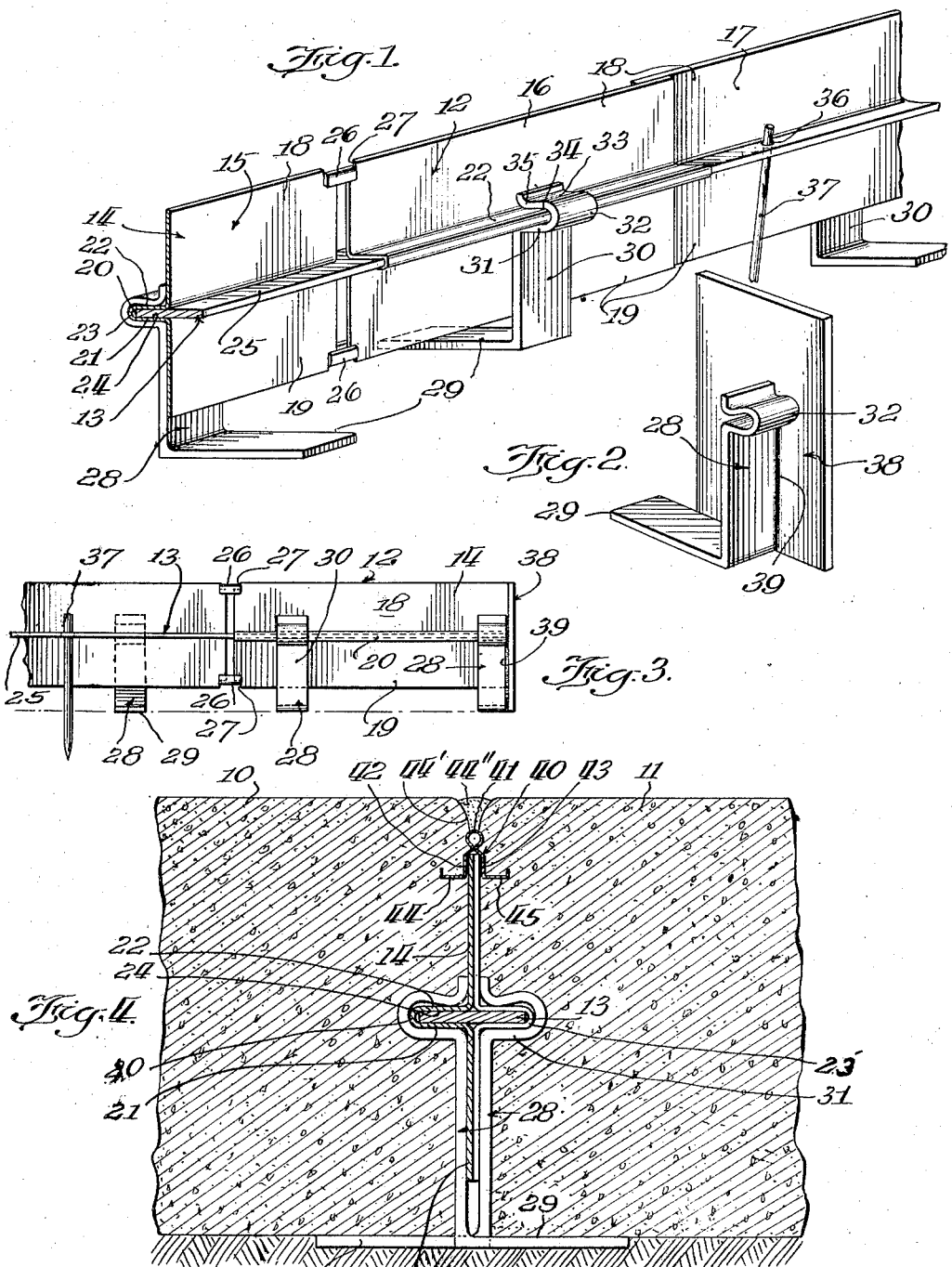
Inventor:
Clifford Older
By Williams, Bradbury, McCaleb & Hinkle
Attys.

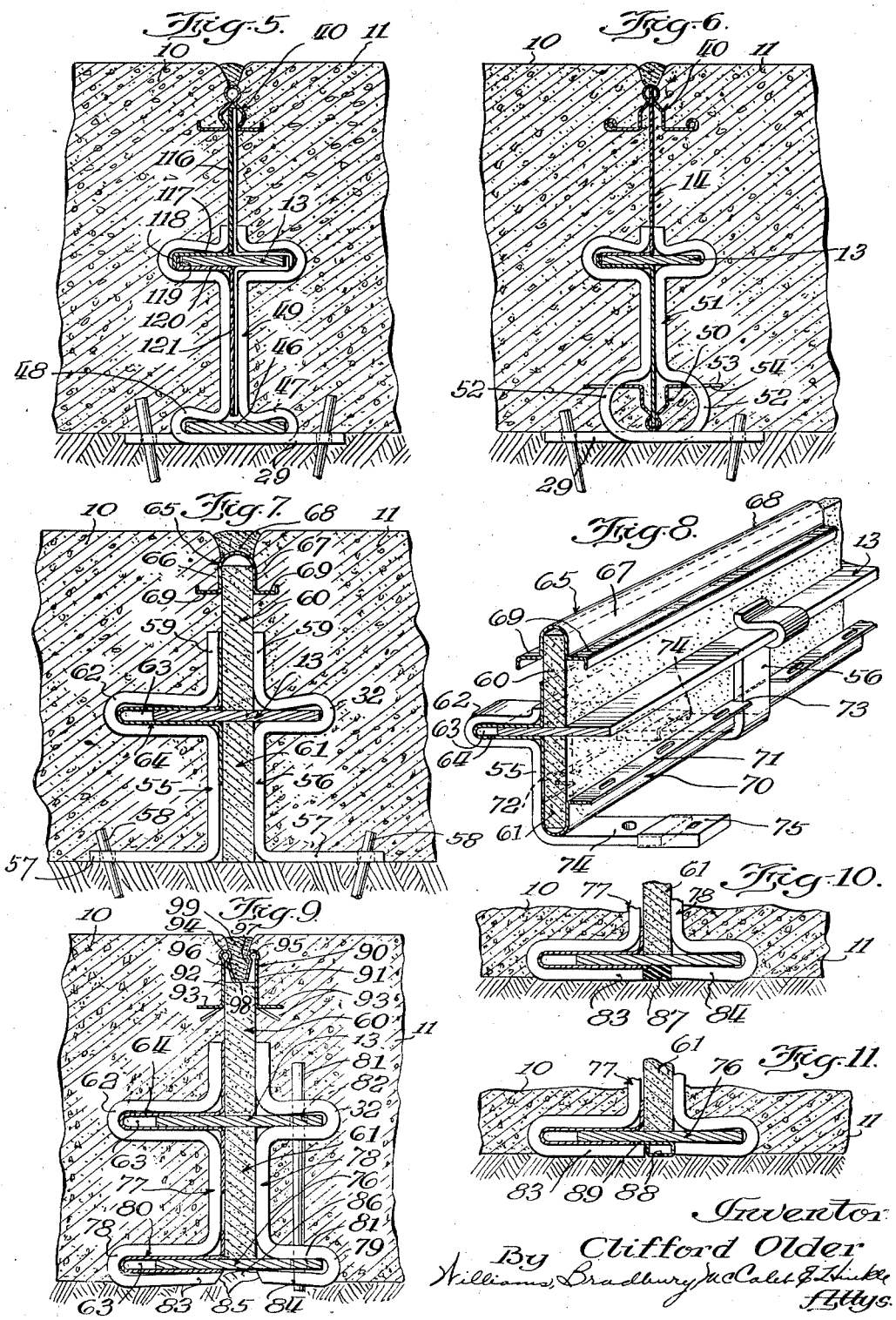

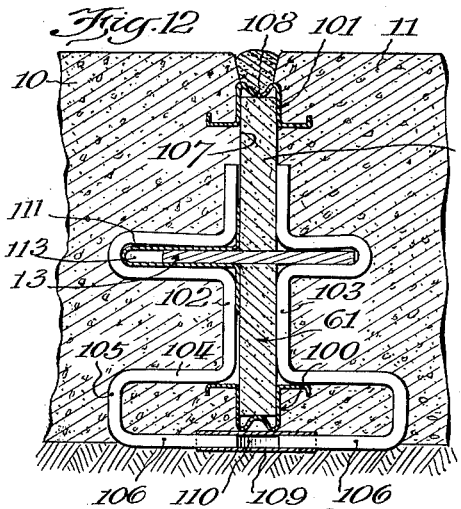
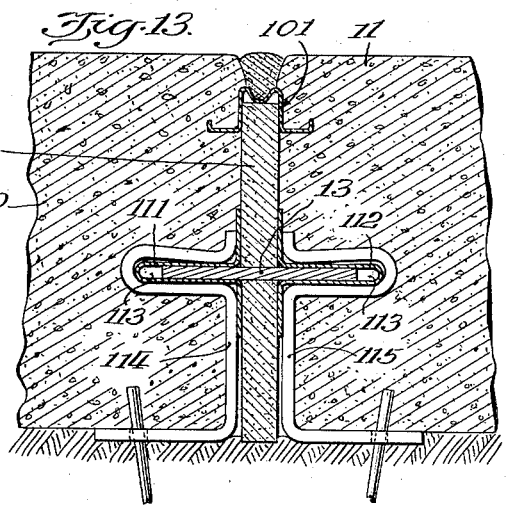
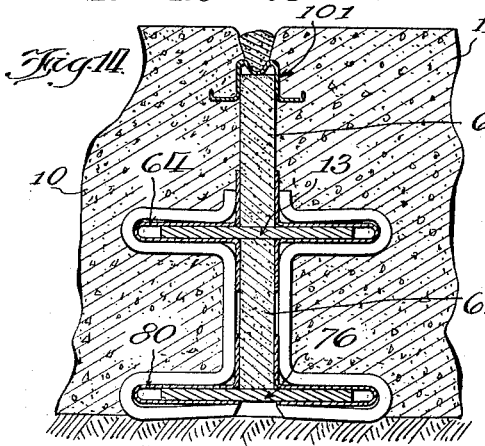
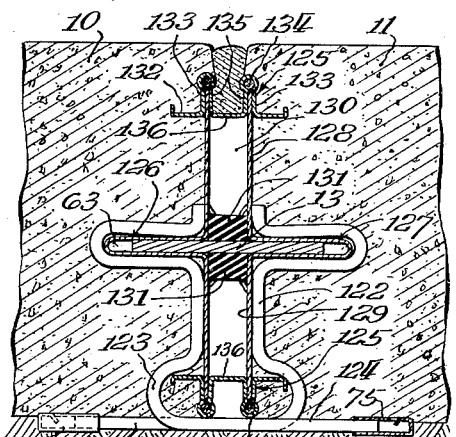
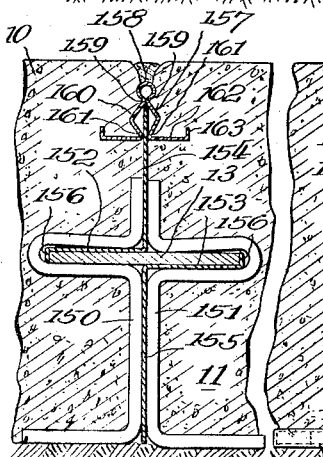
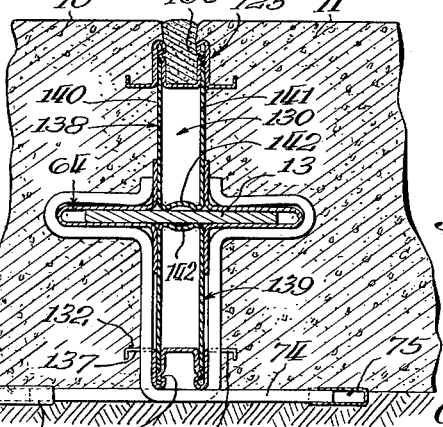

Aug. 1, 1939. C. OLDER 2,167,904
CONCRETE EXPANSION AND CONTRACTION JOINT
Filed May 18, 1936 4 Sheets-Sheet 4
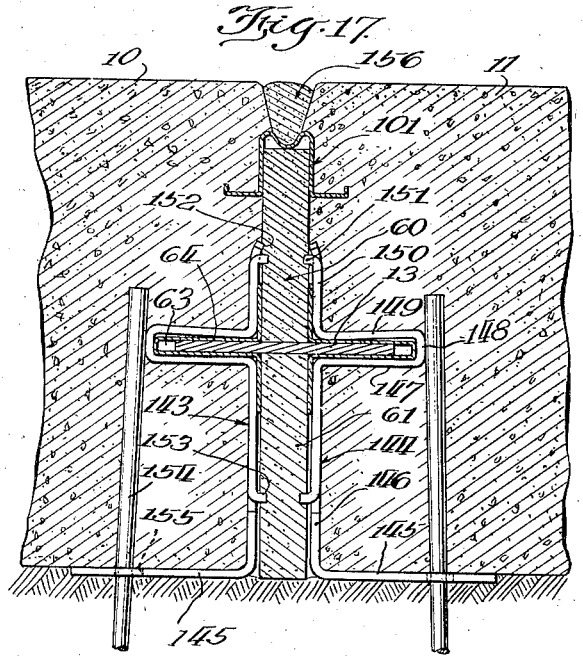
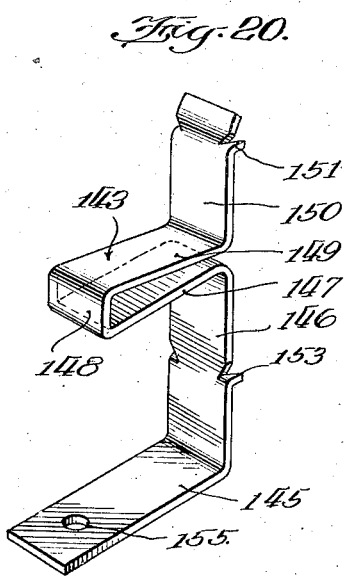
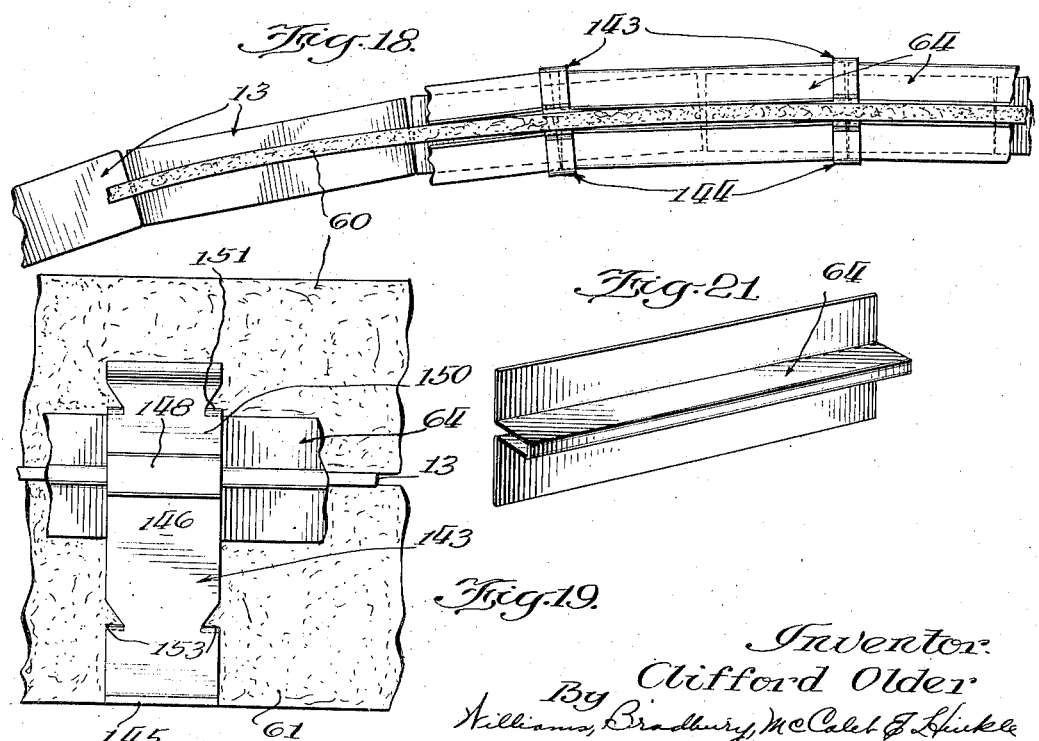
Inventor.
Clifford Older
By Williams, Bradbury, McCaleb & Hinkle
Attys.

Patented Aug. 1, 1939

2,167,904

UNITED STATES PATENT OFFICE 2,167,904

CONCRETE EXPANSION AND CONTRACTION JOINT

Clifford Older, Wilmette, Ill.

Application May 18, 1936, Serial No. 80,281

13 Claims. (Cl. 94—18)

One of the objects of the present invention is the provision of an improved expansion joint structure which is adapted to be shipped "knocked down" so that it may be assembled on the job with a minimum amount of labor, and adapted to meet varying conditions of installation.

Another object of the invention is the provision of an improved expansion joint structure, the parts of which may be constructed of sheet metal so that the parts of the joint may be constructed by stamping operations, thereby reducing the cost of the finished joint.

Another object of the invention is the provision of an improved expansion joint which does not need to be assembled at the factory, and which includes detachable securing and supporting devices of an improved structure adapted to support the joint in assembled condition in the concrete form before the concrete is poured.

Another object of the invention is the provision of an improved concrete expansion and contraction joint which is adapted to be so assembled on the job that it may be used for constructing curved joints.

Another object of the invention is the provision of an improved expansion and contraction joint structure the parts of which are adapted to nest with each other so that they may be more conveniently shipped in a "knocked down" condition.

Other objects and advantages of the invention will be apparent from the following description and the accompanying drawings, in which similar characters of reference indicate similar parts throughout the several views.

Referring to the three sheets of drawings accompanying the specification,

Fig. 1 is a view in perspective of an assembled joint structure for a contraction joint, showing the joint as it appears, just before it is staked into position in the form on the ground;

Fig. 2 is a view in perspective of one form of end plate for closing the crack at the end of the concrete joint;

Fig. 3 is an elevational view of the joint of Fig. 1, with the end plate in proper position;

Fig. 4 is a vertical transverse sectional view of a joint constructed according to Fig. 1, shown in connection with the concrete sections between which the contraction joint is formed;

Fig. 5 is a view similar to Fig. 4, of another modification, in which the bottom of the expansion joint crack between the two concrete sections is closed by a sliding plate;

Fig. 6 is a similar view of another modification, in which the bottom of the crack between the adjacent concrete sections is closed by means of a flexible seal;

Fig. 7 is a similar view of a modified form of construction, which is adapted to be used as an expansion joint as well as a contraction joint, in which the top of the crack is closed by a flexible seal;

Fig. 8 is a fragmentary view in perspective, with the end of the joint in section, showing a modification of the expansion joint of Fig. 7 and utilizing a flexible seal at the bottom of the air space between the concrete sections;

Fig. 9 is another modified expansion joint, in which the clamping members have been modified to provide support for a sliding closure plate at the bottom of the air space between the concrete sections;

Fig. 10 is a fragmentary sectional view of another modification, in which the space between the ends of the clamping members at the bottom of the concrete has been filled with a compressible plastic member to prevent concrete from getting in that space;

Fig. 11 is a view similar to Fig. 10 of another modification, in which that space between the ends of the clamping members at the bottom of the concrete has been filled by a collapsible metal box;

Fig. 12 is another modified form, in which the clamping members have been slidably connected with a telescoping member, and in which the expansion joint has flexible sealing members at the top and bottom;

Fig. 13 is another modified expansion joint, having provision for sliding movement on both sides of the joint and having a flexible seal for closing the top of the air space between the concrete sections.

Fig. 14 is a view similar to Fig. 13 of a modification which differs from Fig. 13 in the provision of a sliding plate closure for the bottom of the joint;

Fig. 15 is another modification of an expansion joint including premolded plastic asphalt members for spacing the walls of an air cell, and utilizing my clamping members with a sliding plate and flexible sealing members at the top and bottom;

Fig. 16 is another modification similar to Fig. 15, in which the collapsible air cell has been provided by means of two separate sheet metal boxes which are adapted to be collapsed when the concrete expands;

Fig. 17 is a fragmentary sectional view of another modification in which the clamping members have been provided with securing means for holding the collapsible or crushable filler which is used initially to form the air space between the ends of the concrete sections;

Fig. 18 is a fragmentary plan view of an installation of an expansion joint constructed according to the invention, such as that shown in Fig. 17, illustrating the use of short lengths to make a curved expansion joint;

Fig. 19 is a fragmentary elevational view of an expansion joint assembly of the type of Fig. 17;

Fig. 20 is a view in perspective of the clamping and supporting member used in the joint of Fig. 17;

Fig. 21 is a view in perspective of a continuous sheet metal socket for the sliding dowel plate.

Fig. 22 is a similar view of another modification embodying a still more simple division plate structure.

Referring to Figs. 1 to 4, these are views showing a contraction joint constructed according to the present invention; 10 and 11 indicate the two adjacent sections of concrete, which are separated by the contraction joint, which is indicated in its entirety by the numeral 12.

The contraction joint preferably includes a continuous dowel plate 13, comprising a plate of sheet metal, such as steel, of substantially uniform thickness and width and of rectangular form. The dowel plate 13 is so arranged that it projects into both of the concrete sections 10 and 11, its center line being arranged along the line of the joint.

The joint is preferably provided with a parting plate 14, adapted to assure the formation of a crack midway between the edges of the dowel plate 13, and the parting plate 14 may consist of a plurality of relatively short sections 15, 16, 17 of parting plate stock. This parting plate stock may all be located on the same side of the dowel plate 13, or the sections 15—17 may be arranged alternately on opposite sides or edges of the dowel plate 13. For example, each parting plate may consist of body flanges 18 and 19, which are joined by a U-shaped fold 20, having a pair of parallel flanges 21, 22 joined by a curved portion 23.

The parallel flanges 21, 22 are spaced sufficiently so that they may slidably receive the dowel plate 13, and the length of the flanges 21, 22 is sufficient so that it will provide for any possible amount of contraction of the concrete and still leave the dowel plate 13 in the groove 24 of the parting plate 14.

The uncovered edge portion 25 of the dowel plate 13, which forms its own groove in the concrete of the adjacent section 11, is preferably greased so as to facilitate sliding between the dowel plate 13 and the concrete. As the concrete contracts, the dowel plate 13 slides in the groove 24 or in the concrete groove at the opposite side of the dowel plate 13.

The upper and lower flanges 18, 19 of the parting plate sections 15—17 may be held in alignment by clamping members 26, comprising U-shaped sheet metal clips which are slipped over the top in notches 27, or I may dispense with the notches in other embodiments of the invention.

In other embodiments of the invention, the flanges 18 and the flanges 19 may overlap each other, as shown at the right between the sections 16 and 17, in which case the parting plate may be provided in standard lengths and the lapping adjusted to accommodate the odd widths of roadway without the necessity for changing any standard dimensions except the cutting of the dowel plate 13 to length.

Fig. 1 shows a short section of the contraction joint as it looks when it is installed in the form before the concrete is poured, while Fig. 3 shows a section of the complete joint after the concrete has been poured and the installation is complete.

The dowel plate 13 and parting plate 14 are preferably supported by a plurality of supporting and clamping members 28, which may be identical in shape and construction, but may be reversed in location. These clamping members also serve as anchoring members, since the clamping portions thereof become anchored in the concrete on account of the shape of these parts.

Each of the clamping members 28 has a relatively long foot flange 29, which extends at right angles to the body flange 30. The body flange 30 is long enough to support the parting plate 13 at the desired position, which is generally midway between the top and bottom surfaces of the concrete roadway, and it carries a horizontal supporting flange 31 at the top. This flange is bent back upon itself at 32, and is provided with a clamping flange 33, which may curve away from the flange 22 at the point 34, but curves downward into engagement with the flange 22 at the point 35.

The clamping flange 33 at the point 35 is spaced from the flange 31 by an amount which is less than the distance between the outside surfaces of flanges 21 and 22 so that the clamping member holds the flanges of the parting plate 14 in firm engagement with the dowel plate 13. This assures lack of unnecessary clearance between the dowel plate 13 and the guide flanges of the parting plate 14, and is essential, since the dowel plate is intended to transmit thrust from one concrete section to the other, with a minimum amount of lost motion.

The dowel plate 13 may be provided with a plurality of spaced apertures 36 located at one side of the center line to receive the stakes 37 which are driven into the sub-soil and project upward to the apertures 36. The complete assembly then rests upon the foot flanges 29 and is held in place by the stakes 37.

Where the dowel plate is engaged by stakes adjacent one edge, it is of course, anchored to the adjacent concrete section and slides relative to the other section. I prefer to dispense with the stakes.

Referring to Fig. 2, this is a view in perspective of an end plate. The end plate 38 comprises a flat rectangular piece of sheet metal which is welded at 39 to the edge of a clamping and supporting member 28. It extends laterally sufficiently to cover any possible crack that may form, and is high enough to extend from the top of the pavement to the bottom.

It should be understood that the shape and construction of the clamping members 28 varies in the different forms of construction of the joint, and an appropriate end plate may be formed in any case by welding, riveting, or otherwise securing a suitable clamping member to an end plate 38.

Referring to Fig. 4, the complete installation preferably also includes a flexible sealing member 40, which consists of flexible, non-corrodible sheet metal, such as copper. The sealing members used throughout the various modifications may take various different forms, many of which are alternatively usable with any of the joints shown.

In this embodiment the sealing member has a flexible bead 41, which is carried by the two body flanges 42, 43, which extend vertically and are themselves joined to anchoring flanges 44, 45. The anchoring flanges may have apertures for anchoring in the concrete, or they may have laterally bent ends or any other type of anchoring formation on the flanges 44, 45 to assure their securement in the concrete 10 and 11.

The vertical flanges 42, 43 may be spaced sufficiently so that the metal seal 40 slidably engages the top of the contraction joint assembly, thereby assuring the support of the seal at the top of the joint. The concrete is customarily formed with a curved surface 44' leading downward to the seal 40, and the crack above the seal may be filled with initially plastic filling 44'', such as asphalt compound.

Referring to Fig. 5, this is a modification in which the joint has been provided with a sliding closure plate 46 of steel or other suitable material at the bottom. In order to accommodate this closure plate, which is located at the bottom surface of the concrete sections 10 and 11, the clamping members have been made of different shape. They may comprise members having the same elements previously described, but having an additional U shaped bend 47 of the same shape as the clamping portion 31, 32, 33, 35, previously described.

This clamping portion 47 is adapted to clamp the sliding closure plate 46, which is held between the oppositely disposed clamping portions 47, 48 of the oppositely disposed clamping and supporting members, each member of this type being indicated in its entirety by the numeral 49.

The contraction joint of Fig. 5 operates like that of Fig. 4 except that the plate 46 assures that the dirt of the subsoil will not rise into the crack between the concrete sections 10 and 11. As the concrete contracts, sections 10 and 11 draw away from each other and are kept in alignment with each other by the dowel plate 13.

The copper sealing member 40 at the top is adapted to expand, each of its anchoring edges being secured to one of the sections of concrete, and it keeps the top of the crack in the pavement closed and prevents ingress of foreign material at this point.

Referring to Fig. 6, this is another modification, in which the top and bottom of the contraction joint have been provided with flexible copper sealing members 40, 50.

In order to provide space for the lower copper sealing member 50, the clamping member 51 is formed with a semi-circular bend 52, which is of sufficient size to embrace the sealing member 50, and which terminates in the usual foot flange 29. This lower sealing member 50 may be located in between the bends 52 of the clamping members 51, and it may slidably engage the lower edge of the parting plate 14.

In order to provide the lower copper sealing member 50 with anchoring flanges 53 extending well into the concrete, these flanges may be provided with slots 54 for passing the clamping members 51.

Referring to Fig. 7, this is a modification in which the invention is embodied in an expansion joint; that is, a joint structure adapted for initial expansion. In this case the clamping members 55 and 56 are again of slightly different shape. The sliding dowel plate 13 may be the same as previously described, and it is engaged on the right side by the clamping member 56, which is substantially similar in construction to the clamping member 28, previously described, except that the foot flange 57 extends in the opposite direction under the concrete section 11, where it is secured to the ground by a stake 58.

It differs also in the provision of an upward extension flange 59, which is adapted to engage the upper half 60 of a crushable filler member. The crushable filler member 60 may be made of cellular material such as Celotex, cork, sponge rubber, etc., or initially plastic material which is premolded to the shape shown, such as asphalt or bituminous material. Anything may be used which permits by the crushing or outflowing the adjacent slabs of concrete to come closer together when the pavement expands, and which is adapted to fill the space during the molding of the concrete.

The filler comprises the two strips 60, 61, the former being located above the sliding dowel plate 13, and the latter below it. These filler strips are sufficient in width to permit the desired amount of expansion of the concrete sections and the thickness depends upon the distance between the expansion joints in a pavement.

The filler strips are held in place between the vertical body flanges of the clamping members 55, 56 and the extensions 59 of these clamping members, which in turn are secured by the stakes 58.

The clamping member 55 differs from the clamping member 56 in that its U shaped bend 62 is composed of two substantially parallel walls, which are longer than that portion of the dowel plate 13 which is located between them, thus leaving a space 63, into which the dowel plate may move when the concrete expands.

The sheet metal socket member 64 differs from the sheet metal socket member 20, previously described, in that it is provided with parallel walls which are wider than the width of that part of the dowel plate 13 located between them, thereby providing the space 63 for the dowel plate 13.

In this embodiment the expansion joint has been provided with a flexible copper sealing member 65, the top of which is of substantailly U shape, having a pair of parallel walls 66, 67 joined by a cylindrical portion 68, and terminating in the anchoring flanges 69 which are anchored in the concrete sections 10, 11. The walls 66, 67 are spaced sufficiently so that the copper seal is slidably mounted on the top of the crushable filler 60, so that the whole assembly may be supported by the feet 57.

Referring to Fig. 8, this is a modification in which the expansion joint of Fig. 7 has been provided with a flexible copper sealing member 70, similar to the sealing member 65 used at the top in Fig. 7. It is slidably mounted on the lower edge of the lower crushable filler member 61, space being provided between the clamping members 55 and 56 and the filler 61.

The anchoring flanges 71, 72 are provided with slots 73 wherever the clamping members 55, 56 are located so that the anchoring flanges may extend into the concrete to be embedded therein.

In this case the supporting foot flanges 74 extend in opposite directions. Therefore, the clamping member 55, which is anchored in the concrete section 10, has its foot flange 74 extending toward the other section.

In order to assure the fact that the concrete will not interfere with the movement of the foot flanges 74 toward the opposite concrete section, each of these foot flanges is preferably provided with a sliding cap 75, comprising a sheet metal member of box-like form, open at one end, and of a suitable size to slide on the foot flange 74.

Such sliding caps are preferably always employed on expansion joints where the foot flange of a clamping member which is anchored in one section extends into the opposite section. The edge of the dowel plate 13 which projects into the concrete section 11 may be oiled so as to permit sliding movement between the concrete and this part of the dowel plate.

Referring to Fig. 9, this is a modification of the expansion joint in which it is provided with a sliding closure plate 76 at the bottom. The lower section of crushable filler 61 rests upon the closure plate 76. The clamping members 77, 78 are identical in construction at the top to the clamping members 55, 56, just described with respect to Fig. 7. At the bottom, however, they are provided with additional clamping formations 78, 79, similar in shape to the clamping formations 62 and 32 and capable of slidably engaging both sides of the closure plate 76.

This embodiment also has the continuous sheet metal socket member 64, previously described, for the sliding dowel plate 13 and a similar continuous sheet metal socket member 80 for the edge of the sliding closure plate 76, which extends toward the concrete section 10.

It should be noted that wherever the clamping members 55, 56 or 77, 78 engage the closure plates 76 or dowel plate 13 directly, the parallel clamping flanges are closer together than where the sheet metal of such a continuous socket member is interposed between the plate and the clamping member.

The engagement of the clamping members with the plates 13 and 76 holds all the parts together, the vertical flanges of the clamping members engaging the crushable fillers 60, 61. If desired, additional securement may be provided by stakes 81 which pass through apertures 82 in that portion of the dowel plate 13 and closure plate 76 which is embedded in the concrete section 11. This would fix the dowel plate 13 and closure plate 76 to the right section 11, permitting sliding movement only at the opposite side into the spaces 63.

The lowermost flanges of the clamping members 77, 78 serve as foot flanges 83, 84, and they are preferably beveled as at 85, so that when the concrete expands, any cement which has penetrated to the space 86 between the ends of these flanges will be cut off from the plate 76 so that it cannot interfere with the movement of the foot flanges 83, 84 toward each other.

Referring to Fig. 10, this is another modification of the structure of the expansion joint of Fig. 9, in which the foot flanges 83, 84 have not been beveled, but the space between them has been filled with an initially plastic or crushable filler strip 87 to assure absence of concrete between these end flanges.

Referring to Fig. 11, this is another fragmentary view of a modified bottom structure for the joint of Fig. 9, in which the space has been filled by a crushable sheet metal box 88, the top flange of which has a securing flange extension 89 that is held between the foot flange 83 and the closure plate 76.

Referring back to Fig. 9, this expansion joint has another type of flexible copper sealing member 90, which has two parallel upwardly extending walls 91, 92 spaced sufficiently to be slidably engaged on the upper crushable filler strip 60. Walls 91, 92 have laterally projecting anchoring flanges 93 which may be apertured or bent, or otherwise shaped to provide anchoring formations. At the top of walls 91, 92 there is a pair of beads 94, 95 which support a pair of downwardly extending walls 96, 97, joined together by a flat bottom wall 98, which rests on the top of filler strip 60.

The usual semi-plastic filling 99 is located in the groove between the walls 96, 97, and the expansion of the strip 90 takes place at the lower bends on each side of the flat bottom 98. The beads 94, 95 are ordinarily anchored in the concrete 10 and 11, but extraordinary contraction of the concrete may draw them out and permit still further expansion.

Referring to Fig. 12, this is another modification of the expansion joint of Fig. 9, in which the joint is formed with a flexible copper sealing member 100 at the bottom, as well as at the top 101.

In this case the clamping members 102, 103 are of different shape at the bottom, but the upper portions are of the same shape as those described in respect to Figs. 7 and 9. At the bottom each clamping member has a flange 104 which extends away from the joint, and which is located just above the anchoring flange of the copper seal 100.

A downwardly extending flange 105 on the clamping member 102 extends to the bottom of the concrete, and a foot flange 106 extends over toward the crack between the concrete sections 10 and 11, terminating flush with the face of the concrete face 107 of the concrete section.

Thus, sufficient space is provided between the clamping members for the flexible seal 100, which is of such shape that it slidably engages the lower edge of the lower crushable filling member 61. It should be noted that these copper sealing members have the usual anchoring flanges embedded in the concrete, and the flexible portion between the vertical flanges of the sealing members 100, 101 comprises a plurality of bends or corrugations 108.

Two foot flanges 102 may be joined by a relatively stiff metal telescoping tube 109, which is of rectangular shape in cross section so as to slidably engage the ends of the straps which comprise the foot flanges 106 of the clamping members 102, 103. This telescoping tube may have a frictional engagement with the foot flanges, thereby aiding and holding the assembly together, and also assuring that there will be a space 110 between the ends of the foot flanges so that expansion of the concrete and movement of the foot flanges toward each other is permitted.

Referring to Fig. 13, this is another modification, in which both edges of the sliding dowel plate 13 are provided with the continuous sheet metal socket members 111, 112, similar in construction to the socket member 64 described in Fig. 7. The socket members 111, 112 have a space 113 at each side, into which the dowel plate 13 may slide, and they are engaged by the clamping members 114, 115. Here the clamping members may be of a shape substantially similar to the clamping member 55 shown in Fig. 7, which has sufficient space in its clamping formation to accommodate the enlarged continuous metal socket members 111, 112.

Referring to Fig. 14, this is a modification similar to Fig. 13, in which both sides of the joint have been provided with clamping members similar to clamping members 77 of Fig. 9, and the bottom of the joint differs from that of Fig. 13 in being provided with the sliding closure plate 76. The continuous sheet metal socket members 64 and 80 for the dowel plate 13 and closure plate 76 are used on both sides.

Referring back to Figs. 5 and 6, it will be noted that each length of the division plate in Fig. 5 is made in two sections. The upper section comprises the vertical flange 116, the horizontal flange 117, and a vertical flange 118. The lower section comprises the vertical flange 119, horizontal flange 120, and vertical flange 121. In such case, the two pieces of which the complete division plate is made, are identical in shape and may be more conveniently nested, so that they can be shipped in a "knocked down" condition.

It should be understood that any of the continuous sockets which have been described in respect to any of the modifications herein may either be constructed, as shown in Fig. 5, in two pieces, with overlapping flanges 118, 119, or, as shown in Fig. 14 at 64, in one piece.

Referring to Fig. 15, this is another modification, which utilizes clamping members 122 of similar shape, but oppositely disposed. These clamping members are similar at the top to the clamping formation 62 of clamping member 55 (Fig. 7) in that they provide additional space 63. At the bottom they are similar to the lower part of clamping members 51 (Fig. 6) in that they curve inwardly at 123 and are provided with oppositely extending foot flanges 124 having the cap members 75 of Fig. 8. The curved portions 123 in this case are large enough to provide space for a larger type of copper sealing member 125. The continuous metal socket members 126, 127 for the sliding dowel plate 13 are identical in shape and provide a space 63 at each edge of the dowel plate 13. They are provided with vertical body flanges 128, 129 above and below of sufficient width to define the air space 130 between the ends of the concrete sections 10 and 11. They are spaced from each other at the middle by the initially plastic premolded strips 131 of asphalt compound, and at the top and bottom by the copper sealing member 125. These copper sealing members have the usual anchoring flanges 132 and have upwardly extending flanges 133 at each side. They have a hair-pin bead 134 above the edge of each wall 128, and a pair of downwardly extending flanges 135 joined by a bottom portion 136. The strips 131 may be held by prongs in flanges 128, 129, or by tie wires. The beads 13 may be filled with jute cord or other crushable material so that flanges 128, 129 slide between flanges 133, 135 and engage the cord. This gives clearance at the edges of flanges 128, 129, so these edges will never cut the beads 134, but will merely crush the cord should the beads be drawn inward.

Referring to Fig. 16, this is another modification, in which the same copper sealing members are employed above and below the joint. The clamping members are similar to the clamping member 55 of Fig. 8, dispensing with the curved portions 123 of Fig. 15.

In order to accommodate the anchoring flanges 132 of the lower copper sealing member 125, these flanges are provided with slots at 137, wherever the clamping members are employed. The clamping members are staggered with respect to each other and regularly spaced along the joint in all modifications where the feet extend in opposite directions, as shown in Fig. 16.

In this case the continuous metal socket members 64 are similar to those shown in Fig. 14 and Fig. 7, and the air space 130 between the ends of the concrete sections 10 and 11 is formed by a pair of sheet metal box members 138, 139. These sheet metal box members each have a pair of vertical flanges 140, 141 which extend from the seal to the dowel plate 13. They are joined by an inwardly curved bottom 142 in the case of the upper member 138, the initial curvature at 142 being for the purpose of facilitating the crushing of the box 138 or 139 when the concrete expands. The foot flanges 74 have the sliding metal cap 75.

Referring again to the danger of the core plates 140, 141 cutting the bend of the seal 125, the plates 140, 141 may have their edges terminate short of the bends in the seal. The seal may have ribs 160 projecting outside the edges of plates 140, 141, and initially spacing these edges from the seal fold. The ribs are sloping on the side towards the plate edges so that when the seal is drawn inward the plate may slide over the rib into the space beyond the rib.

Referring to Fig. 17, this is one of the preferred forms of the invention, and therefore will be described in detail. It comprises the crushable filling members 60, 61 and improved clamping members 143, 144. These clamping members are identical in construction, thereby necessitating the making of only one type of clamping member, and they are provided with foot flanges 145.

The foot flanges support the standards 146 which are bent laterally at 147 and again upwardly at 148. The clamping member is bent laterally again to form the flange 149, which is spaced from the flange 147 by a distance less than the thickness of the composite members which it is intended to clamp.

Flange 149 supports a vertical flange 150, which is provided with inwardly extending prongs 151 and inwardly turned end flange 152 engaging the crushable filler 60. Prongs 153 may also be struck out of the vertical flange 146 to engage the lower crushable filler section 61.

The assembly is held in place by stakes 154 passing through apertures 155 in the foot flanges 145, and the usual dowel plate 13 is covered at both edges with the continuous sheet metal socket member 64.

The flexible copper seal 101 is used at the top and covered with an initially plastic filler 156. The continuous sheet metal curves for the dowel plate provide an expansion space 63 at both edges of the plate. The joint may be shipped in a "knocked down" condition and assembled on the job. The clamping member 143 is shown in detail in perspective view in Fig. 20. The joint is shown in elevation in Fig. 9. The continuous sheet metal socket member 64 for the dowel plate 13 is shown in detail in the prospective view of Fig. 21.

The present joint may be constructed of a series of short lengths of the dowel plate 13, fillers 60, 61, and continuous sheet metal socket 64.

The stakes 154 of Fig. 17 may be made to secure not only the foot flanges 145 but to press the opposite clamping members toward each other by driving them as shown in Fig. 17, with the stake in engagement with the yoke 147 of the clamping member, and passing through the apertures 155.

The lengths may be several feet in length up to several yards in length, depending upon the amount of curvature desired. By assembling such short lengths at the job, as shown in Fig. 18, an expansion joint of any curvature may be made and the structure adapted to many different installations.

The contraction and expansion joints, which are made up of short lengths of dowel plate, continuous socket plates, division plates, flexible seals, space fillers, and/or clamping members, are advantageous not only on curves but on the approach to curves and at any other point in the roadway where the road is to be made wider.

The clamping members are preferably made quite wide, that is, wider than necessary to clamp the socket members or dowel plate firmly, as these clamping members may serve to close the spaces between the dowel plates and continuous socket plates when the ends of the short lengths of these plates do not abut against each other squarely, as on a curve, or when it is desirable to space them to widen the roadway. For example, suppose the clamping members are three or four inches in width, and seven clamps are used on a joint for a roadway. By spacing the short lengths of dowel plate and short lengths of division plates or continuous socket plates and using the clamping members at each juncture of the plates, the wide clamps can be used to span the crack in the socket plates or the crack in the dowel plates wherever a socket plate may not be used.

By means of seven clamps an inch or more may be gained on each clamp, and thus the roadway may be made from seven to fourteen inches wider without the necessity for using any special lengths or parts. If desired, extra wide clamps may also be provided for this purpose, differing from the standard clamps only in the matter of their width.

It should be noted that the continuous socket plates for the dowel plates, which are in the nature of a shield for providing a suitable socket into which the dowel plate may slide, and for aligning the socket with metal, may be made out of as light steel stock as possible. This greatly decreases the cost of the material, and it should also be noted that it is not absolutely necessary that the dowel plates be continuous from one side of the pavement to the other, as short lengths of dowel plate provided with suitable sockets may be made to perform this function just as well as a complete continuous length of dowel plate.

Furthermore, in the contraction joints it is not absolutely necessary that the division plates be continuous from one side of the pavement, as the purpose of the division plates here is merely to weaken the concrete so that the crack will form at the right point. The proper crack will be formed just as well when short lengths of division plates are used, and these short lengths are capable of weakening the concrete to produce the crack at the proper point, even though there are spaces between them where no division plate is present.

Another advantage of the present expansion and contraction joint structures is that the present dowel plate and socket arrangement may be manufactured very economically and may therefore compete with the dowel rod arrangement of the prior art, which is a relatively cheap structure.

It should also be noted that the various elements of the contraction and expansion joints are capable of separate application and use and do not necessarily have to be employed in every case in the complete combinations shown. For example, the structures for keeping the concrete sections in alignment may be used apart from the rest of the joint, or the flexible seals may be used apart from the other parts of the joint, or any of the joints described herein may be used without a flexible seal. I advocate the use of a flexible seal or some other means of preventing egress of foreign material between the cracks at the ends of the concrete sections in every case, but there are many highway engineering departments still employing the unsealed asphalt filled expansion cracks between concrete sections, and the other features of the present joints may be used with advantage in such joints, even though the flexible metal seals are omitted. In any case, I prefer to make the parts of the joint symmetrical so that it is only necessary for the manufacturer to keep in stock a small number of different parts, and in the most simple types of the joints described it will be found that most of the parts of the joint may be ordered directly from the mill in the form of stock which need only be cut to length.

Referring to Fig. 22, this is another modification in which the two concrete sections 10 and 11 are separated by a contraction joint of a very simple type. In this case the two clamping members 150, 151 may be identical in shape, although it will be noted that the left clamping member 150 will be located a little higher than the right clamping member 151, due to the thickness of the horizontal flanges 152, 153 on the division plates 154, 155. This difference in height will be taken care of by the sub-grade into which the lower clamping member can be slightly depressed.

In this case the joint includes the same dowel plate 13 and the clamping members 150, 151 are similar to those previously described, and in particular to those of Fig. 7. They differ slightly in the width of the clamping space, since here they are intended merely to clamp a thin sheet metal member 152 or 153 and the dowel plate 13.

The joint of Fig. 22 may also be built up of a continuous length of each of the parts or of a plurality of short lengths in all or any one of the parts. In case the division plates 154, 155 are made of short lengths, they are preferably not overlapped, as it does not matter if there is a slight crack between the ends of two division plate lengths 154 or 155. The concrete will split or crack at that point just the same.

Each division plate comprises a vertical portion 154 or 155 and a horizontal portion 152 or 153. The division plates have their horizontal portions extending in opposite directions, the one being located above and the other below the dowel plate 13. Thus the division plates may be identical in shape, structure and size, so that only one type of plate need be provided.

I prefer to provide the horizontal flanges 152, 153 with a vertical flange 156, although it is not absolutely necessary. This vertical flange has the advantage that when the division plate is first placed on the dowel plate 13 the vertical flange 156 locates the division plate properly so that the vertical bodies 154, 155 are directly one above the other.

Furthermore, when the clamping member 150 is shoved on the combined members 152 and 13 the division plate 154 does not tend to slide with the clamping member, but sits in its proper place.

The joint is preferably, but not necessarily, provided with the flexible sheet metal seal 157 at the top, which may be provided with the bead 158, providing a substantially closed cylinder, due to the ribs 159 which contact each other. Each depending wall 160 of the seal may be bent outward and then inward again to provide a clamping formation 161 at the bottom which engages the division plate 154. The seal has the usual horizontal flange 162 with anchoring formations 163.

In this case the division plate 154 is clamped at 161, and it extends into the seal only to the point 159. Thus, when the concrete contracts and the seal is drawn apart, the bead 158 may be drawn downward, but the division plate 154 will not have any chance of cutting the seal at 158 because it is spaced from the uppermost part of the seal.

It will thus be observed that I have invented an improved joint structure for concrete pavements and the like, which may be embodied either in a contraction joint or an expansion joint. Various forms of clamping members may be used, as shown, all of which may be shipped in a "knocked down" condition and assembled very quickly at the job. Most of the parts of the joint are constructed of sheet metal, which lends itself to manufacture by stamping and punching operations, so that it may be constructed at a very low cost. The fillers, clamping members, copper sealing members, dowel plates, and closure plates may be combined in various combinations to meet all kinds of different conditions, as shown in the various modifications illustrated.

The present joints are adapted to keep the adjacent concrete sections in alignment with each other and to transmit load from either section to the other. They are also adapted to prevent the ingress of foreign material into the cracks between the concrete sections, whether it be a contraction joint or an expansion joint, thereby assuring the continuous and efficient operation of the joint for a long period of time.

The present joints are also so constructed that the parts thereof may be shipped from the mill as stock materials without the necessity for any further operations except the cutting of these parts to suitable length. The joints are so constructed that there is no chance of the seal becoming damaged by other parts and so that they may be made symmetrically to reduce the number of different parts.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a joint for facilitating contraction of sections of concrete in a pavement, the combination of a sliding dowel plate with a division plate formed with upper and lower body portions and with an intermediate continuous groove for engaging the dowel plate, and a plurality of clamping members adapted to hold the walls of said groove in tight engagement with said dowel plate to assure a close sliding fit between the dowel plate and its socket in the concrete pavement, said clamping members comprising stiff metal members having a stable supporting surface, an upright portion, and a pair of parallel flanges engaging the outer walls of the grooved portion of said division plate.

2. In a joint for facilitating contraction of sections of concrete in a pavement, the combination of a sliding dowel plate with a division plate formed with upper and lower body portions and with an intermediate continuous groove for engaging the dowel plate, and a plurality of clamping members adapted to hold the walls of said groove in tight engagement with said dowel plate to assure a close sliding fit between the dowel plate and its socket in the concrete pavement, said clamping members comprising stiff metal members having a stable supporting surface, an upright portion, and a pair of parallel flanges engaging the outer walls of the grooved portion of said division plate, said division plate being formed in a plurality of overlapping sections whereby the joint may be assembled on the job without the necessity for cutting any part to length except the dowel plate.

3. In a joint for permitting contraction of adjacent concrete sections of pavement, the combination of a division plate formed with an upper portion having a vertical flange and a horizontal flange, the latter flange engaging the top of a dowel plate, the lower section of the division plate having a horizontal flange and a vertical flange, the horizontal flange engaging the bottom of the dowel plate, both said sections of division plate having overlapping vertical flanges at the edge of said dowel plate, and a plurality of clamping members for supporting said division plate and dowel plate, each clamping member having a stable supporting surface, a vertical portion, and a clamping portion which clamps the horizontal flanges of said division plate to said dowel plate.

4. In an expansion joint for concrete, the combination of means for forming an expansion space between two adjacent sections of concrete with a sliding dowel plate, a plurality of clamping members for engaging said means and said dowel plate, each clamping member having an upwardly extending portion, a clamping portion, and a foot flange.

5. In an expansion joint for concrete, the combination of means for forming an expansion space between two adjacent sections of concrete with a sliding dowel plate, a plurality of clamping members for engaging said means and said dowel plate, each clamping member having an upwardly extending portion, a clamping portion, a foot flange, and means for securing said foot flange to the sub-grade.

6. In an expansion joint for concrete, the combination of means for forming an expansion space between two adjacent sections of concrete with a sliding dowel plate, a plurality of clamping members for engaging said means and said dowel plate, each clamping member having an upwardly extending portion, a clamping portion, and a foot flange, said clamping members being formed with auxiliary clamping formations at the bottom and a sliding closure plate mounted in said auxiliary clamping formations at the bottom of the joint assembly to close the crack between the concrete sections at the bottom.

7. In an expansion joint for concrete, the combination of means for forming an expansion space between two adjacent sections of concrete with a sliding dowel plate, a plurality of clamping members for engaging said means and said dowel plate, each clamping member having an upwardly extending portion, a clamping portion, and a foot flange, said clamping members being oppositely disposed and engaging the opposite edges of the dowel plate, and a continuous sheet metal socket for one edge of said dowel plate, having sufficient depth to receive said dowel plate during the maximum expansion of the concrete sections, said socket being clamped on said dowel plate by said clamping members.

8. In an expansion joint, the combination of crushable means for molding the sections of the concrete pavement with an expansion space, said crushable means being provided in two sections, one located above and the other below a sliding dowel plate, a continuous metal socket for said dowel plate on each edge of said dowel plate, and a plurality of clamping members for supporting said expansion joint in proper position, each of said clamping members having a pair of parallel clamping flanges engaging said socket and forcing its walls into close engagement with the dowel plate, and having upwardly extending portions, and also having a foot flange for support on the sub-grade.

9. In a concrete road joint, the combination of a sliding dowel plate with a division plate formed of flexible sheet metal material and provided with upper and lower body portions and with an intermediate continuous groove for engaging the dowel plate and clamping means for holding the walls of said groove in tight engagement with said dowel plate to assure a close sliding fit between the dowel plate and said grooves in the concrete pavement, said clamping members comprising stiff metal members provided with means for support of the clamping members, an upright portion and a pair of oppositely disposed flanges engaging the outer walls of the flexible grooved portion of said division plate whereby tight engagement is assured in spite of the inaccuracies of manufacture.

10. In an expansion joint, the combination of crushable means for molding sections of concrete pavement to form an expansion space, a sliding dowel plate, said crushable means being provided in two sections, one located above, and the other located below said sliding dowel plate, a continuous metal socket on each edge of said dowel plate, said continuous metal socket contacting the upper and lower surfaces of said sliding dowel plate and having opposing flanges adapted to hold said crushable means in position.

11. In an expansion joint, the combination of crushable means for molding the sections of the concrete pavement with an expansion space, said crushable means being provided in two sections, one located above and the other below a sliding dowel plate, a continuous metal socket for said dowel plate on each edge of said dowel plate, and a plurality of clamping members for supporting said expansion joint in proper position, each of said clamping members being of substantially U shape and having its parallel clamping flanges engaging said socket and forcing its walls into close engagement with the dowel plate.

12. In an end plate structure for concrete joints, the combination of a sliding end plate with a joint clamping member, said joint clamping member having a stable supporting foot, an upright standard, and a horizontally extending substantially U-shaped clamping portion for clamping a shield to a dowel plate, said end plate being secured to the edge of said clamping member at a point located to prevent interference with the clamping functions of said clamping member.

13. In a joint unit for concrete roadway, the combination of a dowel plate with a sheet metal sheath for one edge of said dowel plate, and a plurality of clamping members for supporting said dowel plate, said clamping members each having a vertically extending column, a clamping formation carried thereby, and a lower stable supporting flange for the purpose of supporting the joint unit in place for the pouring of the concrete about it, said clamping members being arranged with said foot flanges extending laterally from said joint unit on the subgrade at both sides of said joint unit, said clamping members being arranged with predetermined of said members on the opposite sides of said dowel plate whereby the foot flanges extend in both directions laterally of said joint unit to effect a firmer support of said joint unit on the subgrade for pouring of concrete.

CLIFFORD OLDER.